US012689847B2

(12) United States Patent
Haddy et al.

(10) Patent No.: US 12,689,847 B2
(45) **Date of Patent: *Jul. 21, 2026**

(54) SYSTEMS AND METHODS FOR IMPROVED ASSET MONITORING VIA ORIENTATION MEASUREMENT

(71) Applicant: SILICON CONTROLS PTY LTD., Macquarie Park (AU)

(72) Inventors: John Richard Haddy, Lane Cove West (AU); Michael Alexander St. Leger Neuman, Milsons Point (AU)

(73) Assignee: Silicon Controls Pty LTD. (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/973,831

(22) Filed: Dec. 9, 2024

(65) Prior Publication Data

US 2025/0102119 A1 Mar. 27, 2025

Related U.S. Application Data

(63) Continuation of application No. 17/737,827, filed on May 5, 2022, now Pat. No. 12,167,186, which is a (Continued)

(30) Foreign Application Priority Data

Oct. 21, 2016 (AU) ................................ 2016904290

(51) Int. Cl.
*H04Q 9/02* (2006.01)
*F17C 13/02* (2006.01)
(Continued)

(52) U.S. Cl.
CPC .............. *H04Q 9/02* (2013.01); *F17C 13/02* (2013.01); *F17C 13/045* (2013.01); *G01F 3/00* (2013.01);
(Continued)

(58) Field of Classification Search
CPC ......... H04Q 9/02; F17C 13/02; F17C 13/045; F17C 2201/0104; F17C 2205/0326;
(Continued)

(56) References Cited

U.S. PATENT DOCUMENTS 7,978,065 B2 7/2011 Schnitz et al.
7,990,270 B2 8/2011 Mostov
(Continued)

FOREIGN PATENT DOCUMENTS

AU 2017225142 A1 10/2017
AU 2017346943 A1 4/2018
(Continued)

OTHER PUBLICATIONS

International Search Report—PCT/AU2017/051152, Silicon Controls Pty Ltd., dated Jan. 18, 2018.
(Continued)

*Primary Examiner* — Amine Benlagsir
(74) *Attorney, Agent, or Firm* — Rita C. Chipperson, Esq.; Chipperson Law Group, P.C.

(57) ABSTRACT

An automatic changeover valve switches fluid communication between a fluid outlet and either a first cylinder or a second cylinder, wherein the first and second cylinders hold one or more fluids, such as a liquified gas fuel. A detection device detects acceleration information of the automatic changeover valve. A processing unit analyzes the detected acceleration information and determines when the detected acceleration information indicates that the automatic changeover valve is switching the fluid communication of the gas fuel outlet from the first cylinder to the second cylinder. An alert to a remote computing system is generated of the changeover event.

20 Claims, 6 Drawing Sheets

Related U.S. Application Data continuation of application No. 17/022,884, filed on Sep. 16, 2020, now abandoned, which is a continuation of application No. 16/540,247, filed on Aug. 14, 2019, now Pat. No. 10,812,879, which is a continuation of application No. 15/953,673, filed on Apr. 16, 2018, now Pat. No. 10,440,453, which is a continuation-in-part of application No. PCT/AU2017/051152, filed on Oct. 21, 2017.

(51) Int. Cl.

| | |
|---|---|
| *F17C 13/04* | (2006.01) |
| *G01F 3/00* | (2006.01) |
| *G01F 23/22* | (2006.01) |
| *G01F 23/80* | (2022.01) |
| *G01S 19/13* | (2010.01) |
| *G01F 15/00* | (2006.01) |
| *G01F 23/38* | (2006.01) |
| *G01P 15/00* | (2006.01) |
| *G01P 15/18* | (2013.01) |
| *H04B 1/02* | (2006.01) |

(52) U.S. Cl.
CPC ............ *G01F 23/22* (2013.01); *G01F 23/804* (2022.01); *G01S 19/13* (2013.01); *F17C 2201/0104* (2013.01); *F17C 2205/0326* (2013.01); *F17C 2227/042* (2013.01); *F17C 2250/034* (2013.01); *F17C 2250/0417* (2013.01); *F17C 2250/0465* (2013.01); *F17C 2250/0482* (2013.01); *G01F 15/007* (2013.01); *G01F 23/38* (2013.01); *G01P 15/00* (2013.01); *G01P 15/18* (2013.01); *H04B 1/02* (2013.01)

(58) Field of Classification Search
CPC .......... F17C 2227/042; F17C 2250/034; F17C 2250/0417; F17C 2250/0465; F17C 2250/0482; G01F 3/00; G01F 23/22; G01F 23/804; G01F 15/007; G01F 23/38; G01S 19/13; G01P 15/00; G01P 15/18; H04B 1/02
See application file for complete search history.

(56) References Cited

U.S. PATENT DOCUMENTS

| | | | |
|---|---|---|---|
| 8,164,458 B2 | 4/2012 | Mostov | |
| 8,199,014 B1 * | 6/2012 | Kindeberg ............... | H04B 5/77 |
| | | | 340/568.1 |
| 8,643,503 B2 | 2/2014 | Mostov | |
| 8,803,683 B2 | 8/2014 | Schnitz et al. | |
| 8,890,683 B2 | 11/2014 | Schnitz et al. | |
| 8,907,793 B2 | 12/2014 | Mostov | |
| 9,133,682 B2 | 9/2015 | Tahoun et al. | |
| 9,262,896 B1 | 2/2016 | Mostov | |
| 9,309,726 B2 | 4/2016 | Tahoun et al. | |
| 9,453,388 B2 | 9/2016 | Tahoun et al. | |
| 9,546,916 B1 | 1/2017 | Crane et al. | |
| 10,440,453 B2 | 10/2019 | Haddy et al. | |
| 10,812,879 B2 | 10/2020 | Haddy et al. | |
| 12,167,186 B2 | 12/2024 | Haddy et al. | |
| 2006/0243347 A1 * | 11/2006 | Humphrey ............... | F17C 3/00 |
| | | | 141/95 |
| 2010/0071572 A1 * | 3/2010 | Carroll .................. | B30B 9/3007 |
| | | | 100/229 A |
| 2010/0097208 A1 * | 4/2010 | Rosing ................. | G06Q 10/087 |
| | | | 340/572.1 |
| 2011/0199185 A1 * | 8/2011 | Karaoguz ............... | H04L 67/52 |
| | | | 340/8.1 |
| 2012/0249326 A1 | 10/2012 | Mostov | |
| 2013/0033381 A1 | 2/2013 | Breed | |
| 2013/0154829 A1 * | 6/2013 | Mostov .................. | G08B 25/08 |
| | | | 248/213.2 |
| 2013/0181829 A1 * | 7/2013 | Schnitz ................... | G01F 23/80 |
| | | | 340/539.1 |
| 2013/0274954 A1 | 10/2013 | Jordan, Jr. et al. | |
| 2013/0341035 A1 | 12/2013 | Tahoun et al. | |
| 2014/0094998 A1 * | 4/2014 | Cooper ............... | B61L 15/0036 |
| | | | 701/2 |
| 2014/0111356 A1 * | 4/2014 | LeFebvre ............... | B61L 27/40 |
| | | | 340/988 |
| 2014/0347194 A1 | 11/2014 | Schnitz et al. | |
| 2015/0084766 A1 | 3/2015 | Cordaro et al. | |
| 2015/0136489 A1 | 5/2015 | Tahoun et al. | |
| 2015/0252651 A1 | 9/2015 | Tahoun et al. | |
| 2016/0349097 A1 * | 12/2016 | Crouse .................. | G01F 23/284 |
| 2017/0067770 A1 * | 3/2017 | Sun ........................ | G01F 15/063 |
| 2017/0168631 A1 * | 6/2017 | Roberts-Hoffman ........................ |
| | | | G06F 3/04883 |
| 2017/0364734 A1 | 12/2017 | Melugin et al. | |
| 2018/0052008 A1 | 2/2018 | Maman et al. | |
| 2018/0234748 A1 * | 8/2018 | Haddy ...................... | G01F 3/00 |
| 2020/0413166 A1 | 12/2020 | Haddy et al. | |

FOREIGN PATENT DOCUMENTS

| | | |
|---|---|---|
| AU | 2018202633 A1 | 6/2018 |
| CA | 2871119 C | 10/2013 |
| CA | 2872673 A1 | 10/2013 |
| CA | 2912550 A1 | 12/2014 |
| EP | 1261823 A2 | 12/2002 |
| EP | 2836667 B1 | 2/2015 |
| WO | 2001166984 A2 | 9/2001 |
| WO | 2008033981 A2 | 3/2008 |
| WO | 2013013200 A1 | 1/2013 |
| WO | 2013154420 A2 | 10/2013 |
| WO | 2013155343 A1 | 10/2013 |
| WO | 2014195760 A2 | 12/2014 |
| WO | 2015175969 A1 | 11/2015 |
| WO | 2016093873 A1 | 6/2016 |
| WO | 2018071990 A1 | 4/2018 |

OTHER PUBLICATIONS

Written Opinion—PCT/AU2017/051152, Silicon Controls Pty Ltd., dated Jan. 18, 2018.

* cited by examiner

SYSTEMS AND METHODS FOR IMPROVED ASSET MONITORING VIA ORIENTATION MEASUREMENT

CROSS REFERENCE TO RELATED APPLICATIONS

This application is a continuation of U.S. patent application Ser. No. 17/737,827 filed May 5, 2022, issuing as U.S. patent Ser. No. 12/167,186 on Dec. 10, 2024, which is a continuation of U.S. patent application Ser. No. 17/022,884 filed Sep. 16, 2020, now abandoned, which is a continuation of U.S. patent application Ser. No. 16/540,247 filed Aug. 14, 2019, now U.S. Pat. No. 10,812,879 issued on Oct. 20, 2020, which is a continuation of U.S. patent application Ser. No. 15/953,673 filed Apr. 16, 2018, now U.S. Pat. No. 10,440, 453 issued on Oct. 8, 2019, which is a continuation-in-part of PCT/AU2017/051152 filed Oct. 21, 2017, and claims priority to Australian Patent Application No. 2016904290, filed Oct. 21, 2016, which are incorporated herein by reference in their entirety.

COPYRIGHT NOTICE

BACKGROUND OF THE INVENTION

The disclosure herein generally relates to an electronic device and methods relating to the electronic device, an electronic device having a plurality of modes, a method of changing the mode of an electronic device having a plurality of modes, and specifically but not exclusively to an electronic device for a gauge attached to a vessel, an electronic device for a gas meter, and a telemetric fitting for a gauge attached to a vessel, and a telemetric fitting for gas meter. The disclosure further generally relates to the processor of a telemetric electronic device which is configured to specify at least one particular orientation of the telemetric electronic device when it is attached to the tank or meter, and/or wherein the processor is configured to poll the accelerometer, and/or wherein the processor is configured to trigger sending acceleration information by the transmitter when detected movement and/or orientation of the device reaches a threshold.

Fuels that are gaseous at standard ambient temperature and pressure ("gas fuels") may comprise, for example, methane, ethane, propane, butane, pentane, and mixtures of two or more of these hydrocarbons. Standard ambient temperature and pressure is 25 deg. C. and 101 kPa. Gas fuels may also comprise small amounts of other gases including propylene, butylenes, and additives including, for example, odorant gases in the form of ethanethiol, tetrahydrothiophene, or amyl mercaptan for the detection of gas leaks.

Gas fuels may be compressed to form a liquefied gas fuel. For example, butane, propane, and fuels containing mixtures of these hydrocarbons may be sold as liquid petroleum gas or liquid propane gas, either of which may be abbreviated to LPG. A liquefied gas fuel may be stored in a pressure vessel, examples of which include but are not limited to cylinders and tanks including LPG bulk storage tanks ("LPG bullet tanks"), and liquefied natural gas storage tanks.

Within the pressure vessel is an interface between the liquefied gas fuel and the vapor thereof. The vapor is located above the liquefied gas fuel and within an upper part of the pressure vessel. A vapor outlet in the form of a vapor outlet valve assembly may be attached to the upper part of the pressure vessel.

The quantity of liquefied gas fuel within a pressure vessel may be determined using a liquid-level gauge in the form of a float level-gauge, an example of which is shown in FIG. 1 and generally indicated by the numeral 10. The float level-gauge of FIG. 1 is a ROCHESTER brand float-level gauge which is used with LPG bulk storage tanks, however other examples include TAYLOR and COTRAKO brand float gauges. The float level-gauge comprises a float 12 connected to a stem 14 via a movable joint 16, and a head 18 from which the stem 14 depends. The head 18 is shown in further detail in a top perspective view thereof in FIG. 2. The float level-gauge 10 penetrates a pressure vessel wall and the head 18 is externally attached thereto with fasteners in the form of bolts that pass through bolt passageways 20 to a flange or other suitable mount that is integrated with the pressure vessel, for example by welds or screws. A seal that surrounds the penetrating stem 14 may be sandwiched between the head 18 and a flange integrated with the pressure vessel wall.

The float 12 follows the interface between the liquefied gas fuel and the vapor thereof. A magnet located at the head 18 is operationally coupled to the float 12. Movement of the float 12 is transmitted to the magnet via a gear system at the joint 16. Vertical movement of the float 12 is transformed to a rotation of the magnet at the head 18, and consequently a rotation of the magnet's magnetic field. The magnet is mounted to rotate around the stem axis. Generally, the magnetic field may be followed by a user visible external needle, the orientation of which may indicate the height of the float and the interface that the float follows. The use of the magnet enables measurement of the quantity of liquefied gas fuel within the pressure vessel while maintaining a high strength seal, enhancing safety.

While the description above specifically mentions liquefied gas fuel, the description may generally apply for any suitable type of liquid within a vessel that may or may not be pressurized, for example liquefied ammonia, cryogenic liquids including liquefied natural gas and liquefied permanent gases, and refined petroleum products including petrol, kerosene, and fuel oil.

The pressure within a vessel may be measured with a pressure gauge. The pressure within a vessel containing a non-liquefied permeant gas in its gaseous state, for example, may be read to determine the quantity of gas remaining in vessel.

When a user observes that a gauge indicates that the contents of a vessel is low, the user may contact a supply company to refill the vessel.

Natural gas is generally delivered to a premises via a service line connected to the gas mains. A gas meter may be inserted in the service line to determine the quantity of gas that has been consumed at the premises for billing and other purposes.

Premises may have a plurality of LPG cylinders onsite. An LPG gas changeover valve may control which of the plurality of gas cylinders is connected to a gas outlet. A person may order a gas delivery when a bottle is depleted and the LPG case changeover valve switches to another cylinder.

Electronic devices may interface with gauges, gas meters, or an automatic changeover valve, for example. There may be a need to do at least one of the following:

activating and deactivating an electronic device;

determine whether an electronic device is oriented correctly;

determine whether an electronic device and/or vessel or valve attached thereto has been tampered with; or track the position of a vessel.

BRIEF SUMMARY OF THE INVENTION

In one aspect, a system includes a changeover valve connected to a first cylinder and a second cylinder, wherein the changeover valve is configured for switching fluid communication between either the first cylinder or the second cylinder and a fluid outlet. The system also includes a detection device configured to detect acceleration information of the automatic changeover valve. At least one processor is configured to determine that the acceleration information indicates a rotational motion or vibration of the automatic changeover valve when the automatic changeover valve switches fluid communication to the fluid outlet from the first cylinder to the second cylinder and generate a changeover event alert and/or generate a request to change or fill the first cylinder.

In another aspect, a method is described for monitoring an asset by a system installed on or coupled to the asset, wherein the asset includes a changeover valve connected to a first cylinder and a second cylinder, wherein the changeover valve is configured for switching fluid communication between either the first cylinder or the second cylinder and a fluid outlet. The method includes detecting, by a detection device of the system, acceleration information of the asset and determining, by at least one processor of the system, that the acceleration information indicates a rotational motion and/or vibration of the automatic changeover valve when switching the fluid communication to the fluid outlet from the first cylinder to the second cylinder. The method also includes transmitting, by a wireless transceiver of the system, an alert of a changeover event to a remote computing system.

In another aspect, a system includes a first liquefied gas fuel cylinder and a second liquefied gas fuel cylinder, wherein the first and second liquified gas fuel cylinders are configured to hold a liquefied gas fuel. The system also includes a changeover valve connected to the first and second liquified gas fuel cylinders, wherein the changeover valve is configured for switching fluid communication between either the first liquified gas fuel cylinder or the second liquified gas fuel cylinder and a fluid outlet. The system also includes a detection device configured to detect acceleration information of the automatic changeover valve and at least one processor configured to determine that the acceleration information indicates a rotational motion or vibration of the automatic changeover valve when the automatic changeover valve switches fluid communication to the fluid outlet from the first cylinder to the second cylinder and generate a changeover event alert and a request to change or fill the first cylinder. The system further includes a wireless transceiver configured to transmit the changeover event alert and the request to a remote computing system.

In one or more of the above aspects, the first cylinder and the second cylinder include first and second liquefied gas fuel cylinders configured to hold liquefied gas fuel.

In one or more of the above aspects, the detection device includes an accelerometer configured to detect the rotational motion or the vibration of the automatic changeover valve.

In one or more of the above aspects, a wireless communications unit is configured to wirelessly transmit to a remote computing system.

In one or more of the above aspects, the at least one processor is installed in the system at or near the changeover valve, and the wireless communications unit transmits the changeover event alert and/or the request to change or fill the first cylinder of information to the remote computing system.

In one or more of the above aspects, the wireless communications unit transmits the acceleration information to the remote computing system.

In one or more of the above aspects, the remote computing system includes the at least one processor configured to determine that the acceleration information indicates a rotational motion or vibration of the automatic changeover valve when the automatic changeover valve changes the outlet from the first cylinder to the second cylinder.

In one or more of the above aspects, a global navigation satellite system (GNSS) receiver is configured to obtain location information of the system, and the wireless communications unit transmits the location information to the remote computing system.

In one or more of the above aspects, the at least one processor of the system is configured with at least one predetermined acceleration condition, wherein the at least one predetermined acceleration condition includes a predefined acceleration profile of the rotational motion and/or the vibration of the automatic changeover valve when switching the fluid communication to the fluid outlet from the first cylinder to the second cylinder.

In one or more of the above aspects, at least one sensor detects a usage of a fluid contained in the first cylinder and the second cylinder, and the wireless transceiver transmits the usage of the fluid in the first cylinder and the second cylinder to the remote computing device.

In one or more of the above aspects, the detection device of the system detects additional acceleration information of the asset. The at least one processor of the system determines that the additional acceleration information indicates a changing or filling of the first cylinder and/or the second cylinder. The wireless transceiver of the system transmits an alert of the changing or the filling of the first cylinder and/or the second cylinder.

Any of the various features of each of the above disclosures, and of the various features of the embodiments described below, can be combined as suitable and desired.

BRIEF DESCRIPTION OF THE SEVERAL VIEWS OF THE DRAWINGS

Embodiments will now be described by way of example only with reference to the accompanying figures in which:

FIG. 7 shows the electronic device of FIG. 3 incorrectly attached on the side of a tank.

FIG. 8 shows another embodiment of an electronic device on a gas meter being tampered with.

DETAILED DESCRIPTION OF THE INVENTION

Figure 2:
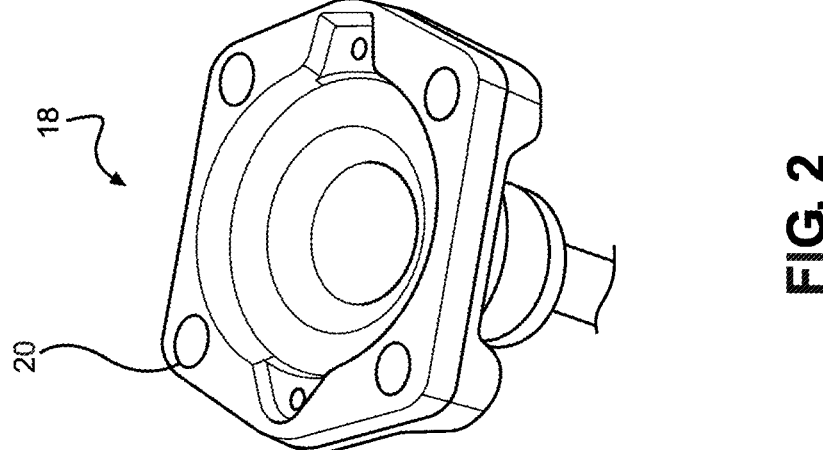
FIG. 2 shows a perspective top view of a head of the float level-gauge of FIG. 1.
Figure 1:
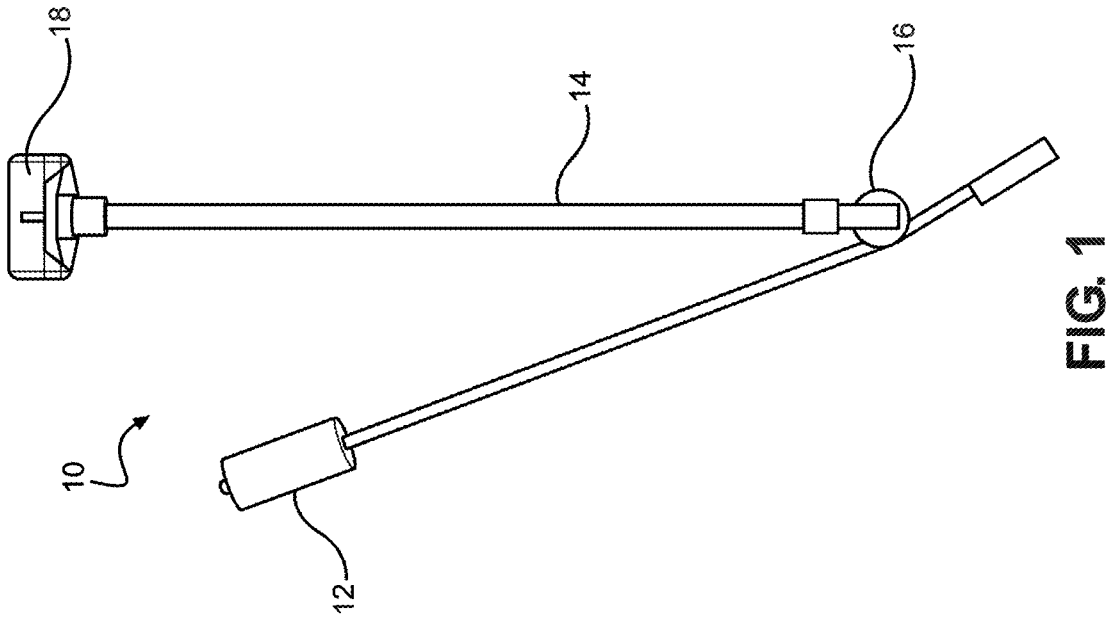
FIG. 1 shows a side elevation view of an example of a prior art float level-gauge.
Figures 3, 4:
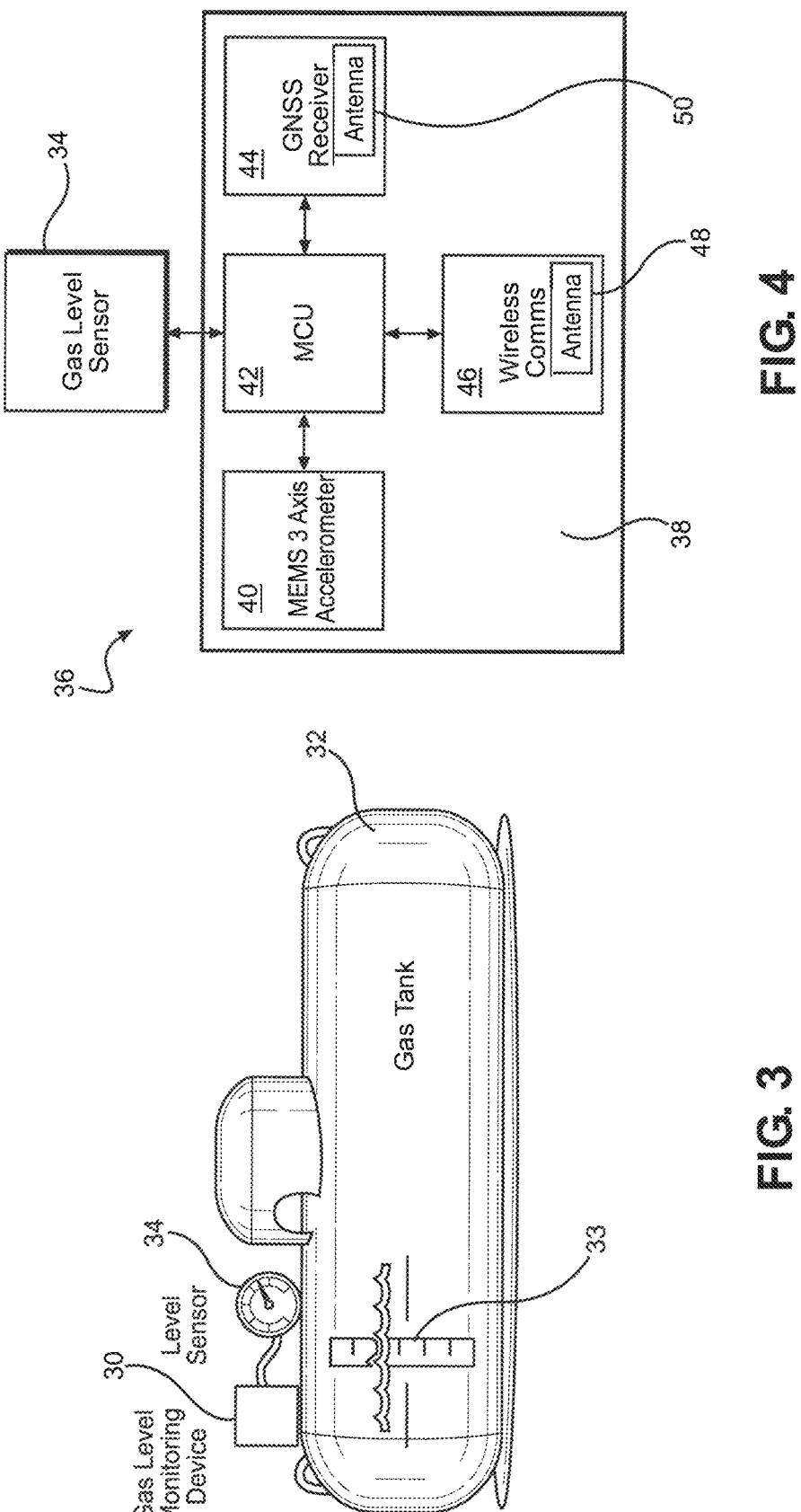
FIG. 3 shows an embodiment of an electronic device on a vessel.
FIG. 4 shows a schematic diagram of example electronics for the electronic device of FIG. 3.

FIG. 3 shows an embodiment of a telemetric electronic device, the telemetric electronic device being generally indicated by the numeral 30. The electronic device is for a gauge 34 attached on a vessel 32 and comprises a telemetric unit or fitting for a level-gauge sensor 34 attached to the vessel 32 for measuring the level 33 of a fluid in the vessel 32. The vessel 32 is in this embodiment a pressure vessel in the form of a LPG bulk storage tank, but the vessel may alternatively be any of a cylinder or a tank for any suitable fluid, examples of which include liquefied gas fuel, liquefied ammonia, cryogenic liquids including liquefied natural gas and liquefied permanent gases, water, solutions, liquid chemicals, and refined petroleum products including petrol, kerosene, and fuel oil. Furthermore, the tank can be referred to as an asset, wherein the asset can be, for example, any fuel handling and storage systems. While a magnetically enabled float gauge fuel-level sensor system is depicted in FIGS. 1 and 2, it is understood that a fluid-level or fuel-level sensing device can be enabled by any type of technology, for example, ultra-sound/ultrasonic, optical, pressure, amme-ters, voltmeters, and any other type of sensor system and any fluid-level detection is within the scope of this discussion.

For example, alternative embodiments described in fur-ther detail below include:

an electronic device for a pressure gauge;

an electronic device for a gas meter, which may comprise a telemetric fitting for the gas meter; and an electronic device comprising an automatic changeover valve.

FIG. 4 shows a schematic diagram of example electronics 36 in the form of a printed circuit board assembly (PCBA) within the electronic device 30, the electronics comprising a plurality of electronic systems 40, 42, 44, 46, 50 mounted on a printed circuit board (PCB) 38. Mounted on the PCB 38 is a MEMS (micro-electro-mechanical systems) accelerometer 40, a Global Navigation Satellite System (GNSS) receiver 44, a radio 46, and a processor 42 in the form of a micro-controller unit in communication with each of the other plurality of modules 40, 44, 46. A power source in the form of a battery is generally included. Each of the radio 46 and the GNSS receiver comprise an antenna 48, 50.

The accelerometer 40 is in the form of a micro-machined device that can detect physical acceleration in 1, 2 or 3 axis and provides an analogue and/or digital signal encoding an acceleration vector (i.e., magnitude and direction). The accelerometer 40 can be used for orientation and motion detection. The acceleration vectors from the accelerometer can be integrated once (with respect to time) to obtain velocity, and double integrated to provide a distance vector.

The GNSS receiver 44 detects signals from a constellation of satellites in Earth orbit (generally from one or more of the GPS, GLONASS, Galileo and Beidou constellations) to determine the geographic position of the GNSS receiver on Earth which is encoded in GNSS information. The GNSS information may include other information, for example time. The absolute position data gathered over time can be summed to obtain a distance vector. The distance vector can be differentiated once (with respect to time) to obtain a velocity vector, and it's differentiated twice to obtain an acceleration vector. These vectors are generally absolute vectors with respect to Earth.

The GNSS receiver 44 comprises a System on Module (SOM), or a single integrated circuit (IC) with peripheral components, each with one or more antenna front end circuits. The antenna 50 may be a circuit component on the SOM or the PCB 38, or it may be connected via a connector for placement further from the main circuitry or external of housing.

The radio 46 is for wireless transmission of information at radio frequencies. The radio 46 wirelessly transmits the GNSS information and the accelerometer information to a remote computer system in the form of computer server via a communications network. The computer server may be real or virtual. The radio encapsulates a string of symbols encoding the information in accordance with a communica-tions protocol and subsequently sends the encapsulated string of symbols, together with identification information indicative of the identification of the electronic device 30. The radio 46 comprises at least one of a medium range radio network interface and a long range radio network interface. Medium-to-long range wireless links enables transmission to centralized data centers, for example, using either private and/or commercial radio base stations. In this embodiment, the radio network interface comprises a low power wide area network (LPWAN) interface. The LPWAN interface com-prises a low-power wide area network radio (LPWAN) integrated circuit. An LPWAN is a type of wireless com-munications network for medium to long range communi-cations at bit rates which are generally, but not necessarily, low, and has low power consumption when compared to cellular communication technologies for voice and high bandwidth data services. Examples of LPWAN include but are not limited to LoRa, and SIGFOX. The LPWAN radio integrated circuit may be within an LPWAN radio module. The range achieved LPWAN depends on many factors, including the presence of obstacles in the transmission path, but ranges of more than 5 km are common, for example 5-10 km.

Alternative embodiments may have a radio comprising another type of medium range radio network interface or long range radio network interface, for example a cellular radio network interface (examples of which include but are not limited to GSM, CDMA, and LTE cellular radio network interfaces), IEEE 802.11 interface ("Wi-Fi") and a satellite communications interface.

Figures 5, 6:
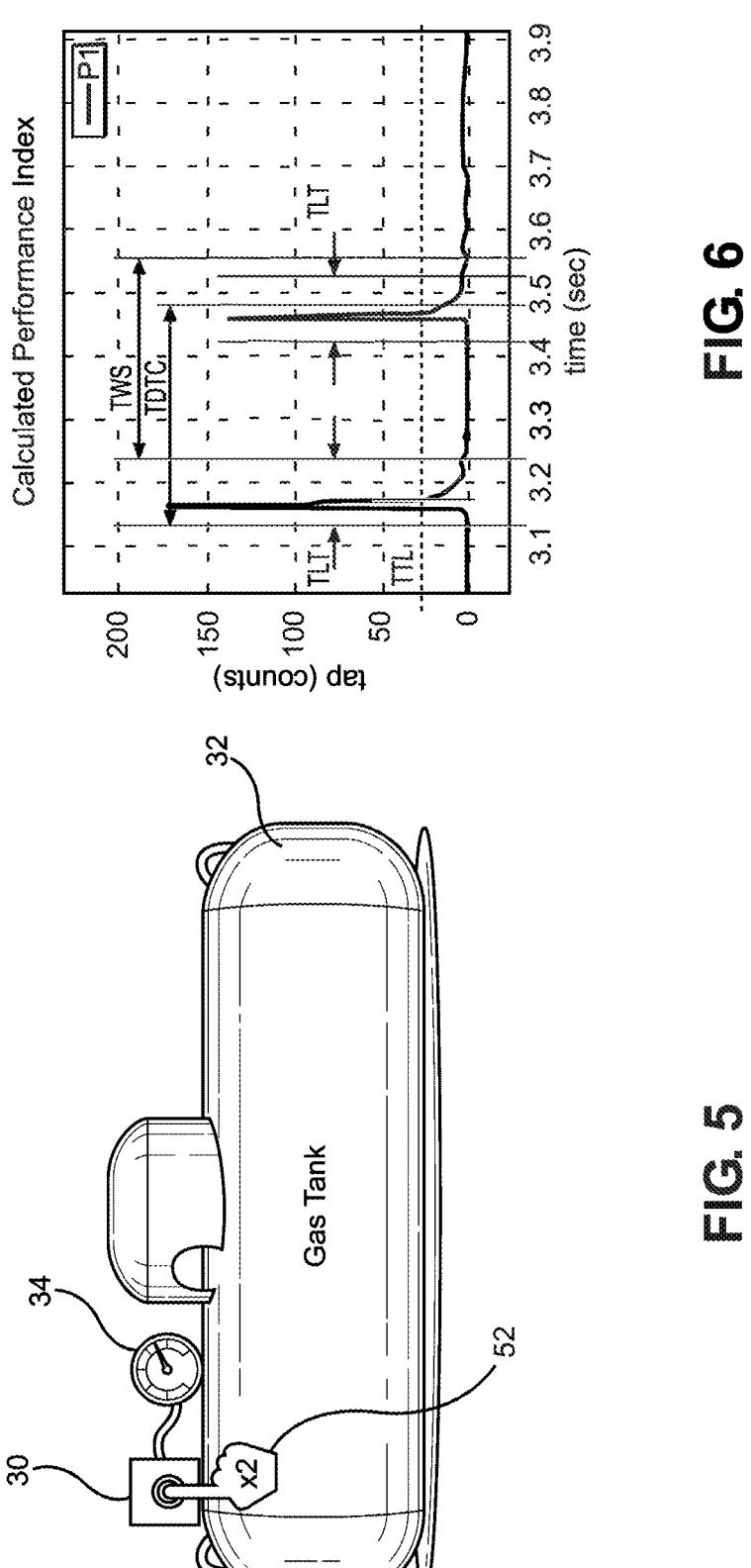
FIG. 5 shows the electronic device of FIG. 3 being tapped.
FIG. 6 shows a chart of accelerometer information generated by the electronic device of FIG. 3.

The electronic device 30 has a plurality of modes, in this embodiment at least two modes, however alternative embodiments may have 3, 4, 5 or more modes. As indicated below, modes and states are used interchangeably herein. Terms such as a "first mode" and a "second mode" have been used to describe different modes of the disclosed device. It is understood that a first mode and a second mode may also be referred to as a "current mode" and "another mode" as well. The list of modes or states provided herein is not to be taken as all inclusive. Any modes or states are within the scope of this discussion. There may be a distinc-tion between a sensor sensing the state of the tank or meter or asset and a sensor sensing the usage of the tank or meter or asset. The sensors may be any suitable sensors. Different modes or states may apply to a sensor sensing the state of the tank or meter or asset and a sensor sensing the usage of the tank or meter or asset. The accelerometer 40 is configured to generate accelerometer information when the electronic device is oriented, moved, polled or tapped, as shown in FIGS. 5 and 6.

As discussed above, the accelerometer 40 can be used for orientation and motion detection and any other suitable function. As discussed below, the processor in the electronic device 30 can be configured to specify a particular location and orientation for the device to be attached to the tank 32. Also discussed below, the accelerometer can be used to determine the orientation of the electronic device 30 with respect to the direction with respect to the ground and the electronic device's approximate position on the tank can be inferred. For example, as described below, if the electronic device is specified to be attached to the top surface of the tank facing up, but it is incorrectly attached to the side surface of the tank, the incorrect orientation may be detected by the accelerometer and the processor, polling the accelerometer can determine that the orientation is incorrect. That is, upon installation on the tank or meter, the asset, if when polled or monitored, the accelerometer generates accelerometer information which provides an orientation of the device on the tank or meter that is not the same as or the same within tolerances, the processor may not trigger acquisition and transmission of GNSS information by the GNSS receiver. Alternatively, if the accelerometer information provides an orientation of the device on the tank or meter upon installation that is the same as or the same within tolerances, the processor may not trigger acquisition and transmission of GNSS information by the GNSS receiver.

Accordingly, a local (mobile) device and/or a remote server may report either no GNSS signal sent, or an affirmation of a signal sent which can include the coordinates determined by the GNSS receiver to verify that the device has been properly installed and that it is in a particular location. In this way, a local distribution worker, or a remote server center may determine that the device has the correct orientation on the tank or meter, and/or receive location coordinates. Also discussed below is, for example, the processor 42 may not switch to an operational or commissioning mode, for example, when the accelerometer information indicates that the electronic device 30 is not correctly oriented, for example, upright, for example, within a range or tolerance. For example, as mentioned, different orientations during transport and installation are specified to deactivate the electronic device 30 during transport. Also, as mentioned below, the processor 42 can be configured to switch modes in response to the accelerometer information satisfying an orientation condition.

In another embodiment, the orientation can be detected as a small deviation from a reference orientation which can be stored information on the processor. A determination can be made by the manufacturer as to a range or tolerance associated with a reference orientation, where if the detected orientation of an installed telemetric electronic device exceeds the range or tolerance, the device may not operate correctly which could be dependent upon the liquid-level or fuel-level sensor type. For example, an ultra-sound sensor may be highly dependent upon the orientation of the device with respect to the liquid-level surface. Accordingly, the at least one particular orientation may have a range or tolerance associated thereto, possibly less than 1 degree or more than 1 degree from a reference orientation. For example, if at least one particular orientation, perpendicular to the ground reference orientation is stored on the processor, the device can be configured to switch from a current mode to another mode when the accelerometer detects that orientation. In that case, the orientation satisfies at least one particular orientation which is stored in the processor. In the event that the accelerometer detects and orientation that is not stored in the processor, the device may not switch from a current mode to another. In that case, the accelerometer detects an orientation which does not satisfy at least one particular orientation which is stored in the processor.

As mentioned above, an accelerometer is coupled to the processor, wherein the accelerometer is configured to detect acceleration consistent with movement that reaches a threshold and wherein the processor is configured to trigger sending acceleration information by the transmitter when the movement reaches the threshold. A threshold condition may be consistent with a tamper event. For example, a person may try to remove the device from the asset. For example, a tamper condition may be satisfied if the acceleration information indicates that a particular threshold has been met which may be caused by a sharp blow or shock that has been delivered to the device 30, or the orientation of the device 30 has unexpectedly changed, or the device 30 has been moved. Under various conditions, an accelerometer will "interrupt" the processor to wake up. The processor can then query the accelerometer for the condition that caused the interrupt such as a tamper condition. On the other hand, the processor can poll the accelerometer for its condition, not having been woken up by the accelerometer. As disclosed, after installation, the processor can poll the accelerometer to determine various conditions as described herein, and when they meet conditions specified by the processor, for example, the GNSS can be triggered for acquisition and transmission of GNSS information in response to that acceleration information. The described installation process, where orientation is determined which will determine if the device is properly installed, and when it meets the conditions specified by the processor, the GNSS can be triggered for acquisition and transmission of GNSS information in response to that acceleration information.

While FIG. 5 shows the electronic device 30 being physically tapped with a finger 52, it will be appreciated that the electronic device may be configured to detect acceleration consistent with movement that reaches a threshold, wherein the processor can be configured to trigger sending acceleration information by the transmitter when the movement reaches the threshold. An example of such a movement may occur when the electronic device is tapped with any object suitable for gently striking the device and imparting a detectable shock thereto, typically a short sharp shock, for example by using a mallet, screwdriver, wand or custom-designed implement in an effort, for example, by a user to change the device's mode or state from a current mode to another mode. The processor 42 receives the accelerometer information and is configured to switch from one mode (the "first mode") of the plurality of modes to another mode ("the second mode") of the plurality of modes in response to the accelerometer information satisfying an acceleration condition which is the reaching of a threshold. As mentioned below, there may be an acceleration threshold that must be reached before the processor acknowledges a tap. It should be understood that referring to two modes as the "first mode" and the "second mode" does not imply that the first mode always chronologically precedes the second mode (there may be circumstances in which the second mode precedes the first mode), nor does it imply that the first mode is more important than the second mode, nor does it imply that plurality of modes consists of only two modes.

The acceleration condition may generally be any suitable or relevant acceleration condition, as discussed above, however some examples of accelerometer conditions include but are not limited to:

the accelerometer information is indicative of a plurality of taps;

the accelerometer information is indicative of a tap on a selected surface of the electronic device; and the accelerometer information is indicative of a predefined sequence of taps on a plurality of surfaces of the electronic device.

Detecting, for example, a double tap, a tap on a selected surface, or a predefined sequence of taps on a plurality of surfaces of the electronic device 30 may reduce the number of false positive detections when compared with a single tap. These detection protocols may be programmed into the electronic device firmware or software, for example.

FIG. 6 is a chart of the accelerometer information generated by the accelerometer when tapped twice by the single finger 52. A tapping event generally generates a particular acceleration profile which may be detected, and thereby acceleration threshold conditions may be matched to one or more of those stored in or by the processor, such indicative of various types of events as described above. The vertical axis is acceleration and the horizontal axis is time. It will be appreciated however that the accelerometer information may comprise information for two or three acceleration axis. The analysis lines in FIG. 1 indicate the time periods in which the processor looks for the two taps. There may also be an acceleration threshold that must be reached before the processor acknowledges a tap. The processor is configured to switch to the second mode in response to the accelerometer information satisfying a first or particular acceleration condition. The processor is, in this but not all embodiments, configured to switch to the first mode in response to the accelerometer information satisfying a second acceleration condition. For example, the first mode and the second mode may each comprise one of a production mode, a transport mode, a commissioning mode, an operational mode, and a decommissioned mode, however other embodiments may have more or less modes. The processor is configured a switch from one mode or state to another mode or state in response to a particular acceleration condition being satisfied. For example, the processor 42 may switch from production mode to transport mode, transport mode or decommissioned mode to commissioning mode, commissioning mode to operational mode, and operational mode to decommissioned mode. Before commissioning, the electronic device 30 is in a low power consumption mode to conserve power, which also reduces or inhibits transmission. In some embodiments, the processor 42 is inactive or not powered in the transport and/or decommissioned mode and the accelerometer triggers the processor 42 to become active when the accelerometer detects one or more taps, for example a double tap.

Figures 7, 8:
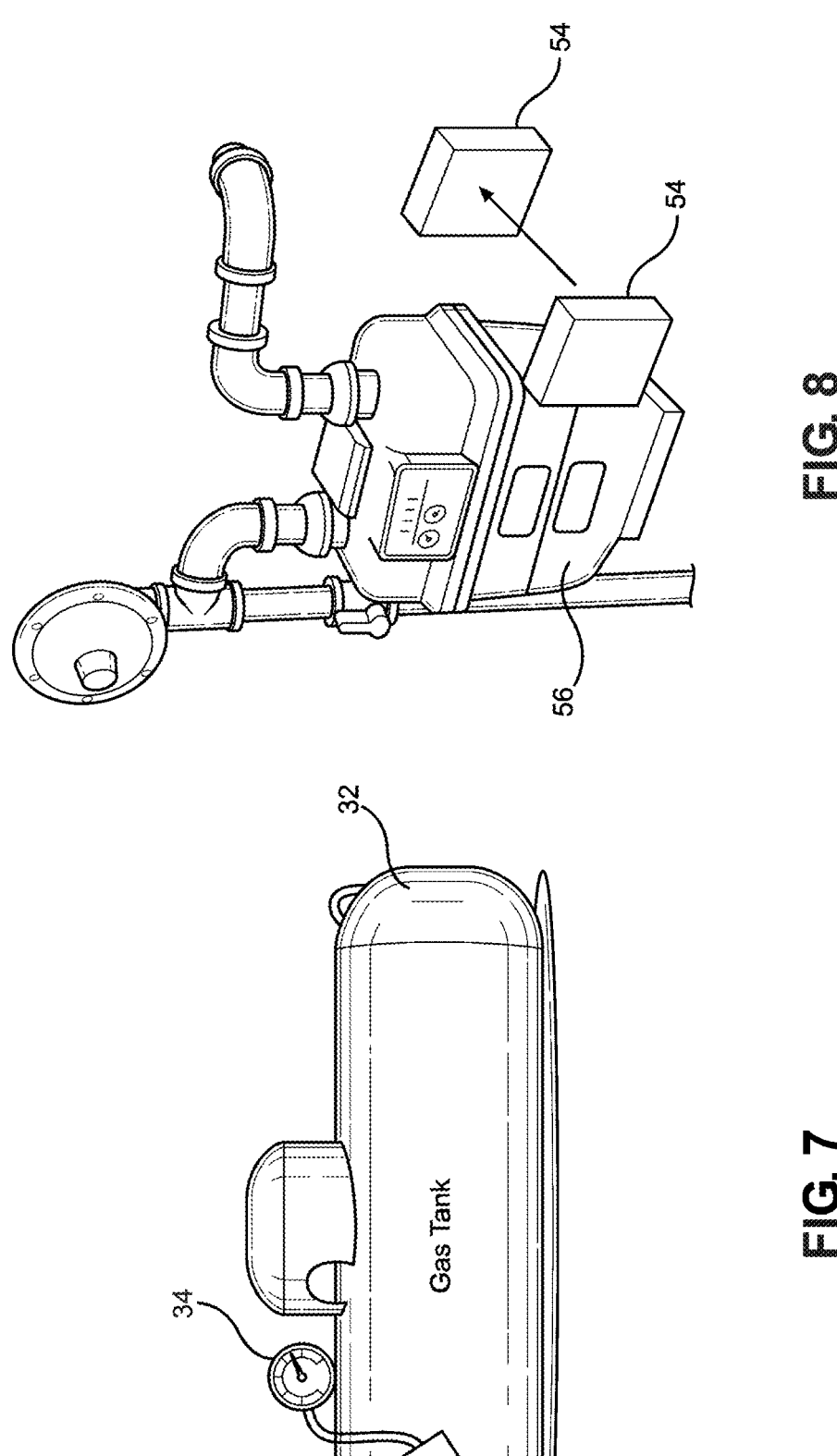

Various orientation, movement and acceleration conditions may occur for which thresholds may apply to indicate various conditions such as the state of the asset or tank or meter, or the usage of the asset or tank or meter. For example, the thresholds may be determined based upon empirical testing by the manufacturer. In one example, the processor 42 is configured to trigger the sending of a tamper alert in response to the accelerometer information satisfying a tamper acceleration condition, generally but not necessarily in the operational mode. For example, the tamper condition may be satisfied if the acceleration information indicates a sharp blow or shock has been delivered to the device 30, or the orientation of the device 30 has unexpectedly changed, or the device 30 has been moved. FIG. 8 shows another embodiment of an electronic device 54 for a gas meter 56 being tampered with. The electronic device 54 has identical or similar electronics 36 to the embodiment 30. A change in orientation and/or accelerations consistent with movement of the electronic device 54 is detected by the processor and a tamper alert or earthquake alert in the form of a message is sent to a computer server for processing. The remote computer system may send an email or SMS alert, or generally any suitable type of electronic alert, to a person, for example a technician, in response to tampering being detected.

In another example, the electronic device may be installed on an asset or tank or meter correctly, and then over time, may slowly move so that its orientation is not within tolerances for performance. For example, as mentioned, the processor may be configured to poll, monitor, detect or survey output of the accelerometer, which in this context may be one of, for example, continually, periodically, randomly, fixed intervals, repeating intervals, regularly, and progressively. In this way, the processor may poll the accelerometer for accelerometer information in a manner depending for example, on its mode or state. For example, it may poll the accelerometer at installation. The device may determine that installation has taken place by a waking procedure. Otherwise, while the device is in one or one or more different states, it may poll the accelerometer. The frequency of the polling may be determined by its state wherein particular acceleration information would be more important in one state or another state.

As mentioned, the disclosed telemetric electronic device may be configured for installation on the top of a tank, or on the side of a tank wherein, the processor may be configured to specify that the telemetric electronic device is to be attached to the top surface of the tank facing up or on the side of the tank. It is understood that any position for installation is within the scope of this discussion, and the position for installation may include, for example, the underside of the tank. FIG. 7 for example, shows the electronic device 30 incorrectly attached on the side of a tank 32, instead of at the top of the tank as shown in FIG. 3. This incorrect orientation may have occurred at installation, in which case the device may not move into an operational mode or state. On the other hand, the device may have moved quickly or slowly, wherein the processor polling the accelerometer for orientation information, would determine that the orientation of the device has changed, and therefore, initiate an alert state, for example.

In another embodiment of the electronic device (not shown) the device may be a single unit, for example, resemble a tower, cylinder, box or any shape, being a single unit or piece having the electronic components housed in a unitary arrangement and not including two pieces (see the figures) wherein one piece is connected to the gauge head and by a wire or lead attached to the housing in which the electronics is housed. That is, the electronic device may be a single fitting designed to sit on top of the gauge head. In one embodiment, the electronic device may be designed so that it can be attached to the side of the tank or meter or on top of the tank or meter. In practice, a telemetric electronic device can be assigned to a tank or meter at a particular location at a merchant's facility, prior to its delivery to the tank or meter at the location. A gas distribution delivery professional may install the telemetric electronic device on a tank or meter at the location out in the field during the course of deliveries, for example. The processor may be pre-programmed to expect that the device will be installed on the side of a tank or meter, and therefore, the orientation of the device, if upright, may be known to the processor as it polls the accelerometer for orientation information upon installation. Upon installation, the device may become aware of the installation, for example, through taps as mentioned above. Also, a tool including a magnet held close to an on/off switch may make the device aware of installation. If at installation, the orientation which is expected to be on the side of a tank or meter, is actually upright, when the processor polls the accelerometer and determines that the orientation is incorrect, the processor may not proceed into an operational state, and may instead provide a message locally and/or to a remote server that the orientation is not correct.

As discussed, the processor can be configured to specify at least one particular orientation for the electronic device when it is attached to the tank or meter and wherein the accelerometer is configured to detect a change in the orientation of the electronic device such that the telemetric electronic device is not within at least one particular orientation has a range or tolerance associated thereto. For example, if the device were attached in the correct orientation, but was off by, for example one degree, and therefore not within range or tolerances, the device would not switch into operational mode. If on the other hand, the device is installed having an expected orientation within tolerances, the device may switch to an operational mode. Accordingly, when the accelerometer detects an orientation which does not satisfy at least one particular orientation, the processor is configured to not switch from a current mode to another mode and wherein when the accelerometer detects an orientation which does satisfy at least one particular orientation, the processor is configured to switch from a current mode to another mode.

When the processor switches from a current mode to another mode, for example, when the accelerometer detects an orientation which does satisfy at least one particular orientation, the processor may be configured to trigger acquisition and transmission of GNSS information, for example, so that the location of the device may be confirmed. The processor can trigger the GNSS receiver to generate GNSS information under other conditions as well as mentioned. For example, triggering the GNSS receiver to generate GNSS information may occur in at least one of the transport, operational, commissioning, or decommissioned modes, for example. Modem accelerometers have very low "sleep" current whereas a GNSS receiver may not draw such a low current (relative to 10+ yr operation on a small primary battery). Thus, using the accelerometer to continuously detect a possible tank relocation and only triggering the GNSS to qualify that the tank has been moved, may result in a very significant saving in battery energy. This provides near-immediate location-change notification, as opposed to an alternative approach to reducing battery usage which involves triggering the GNSS on an infrequent basis, say monthly, by having long periods between GNSS periods of operation to achieve at least 10 years of operation when the electronic device 30 is powered by a small on-board primary battery.

The device itself can be tracked whilst not mounted on the intended tank/ACO/meter to track the device's location.

The acceleration information may also be sent by the radio 46 to the remote computing system so that a tank filling event or other event can be detected.

The processor 42 is configured to switch modes only in response to the accelerometer information satisfying an orientation condition. As mentioned, FIG. 7 for example, shows the electronic device 30 incorrectly attached on the side of a tank 32, instead of at the top of the tank as shown in FIG. 3. The accelerometer information indicates that the electronic device 30 is not upright. The processor in the electronic device 30 specifies a particular location and orientation for the device to be attached to the tank 32. The accelerometer can be used to determine the orientation of the electronic device 30 with respect to the direction towards the ground and the electronic device's approximate position on the tank can be inferred. For example, if the electronic device is specified to be attached to the top surface of the tank facing up, but is incorrectly attached to the side surface of the tank, the correct orientation will be detected by the accelerometer. The processor 42 will not switch to an operational or commissioning mode, for example, when the accelerometer information indicates that the electronic device 30 is not correctly oriented, for example upright. For commissioning, the accelerometer 40 can be used to detect for the correct orientation of the electronic device 30 and to detect a tap sequence in the form of a double-tap to initiate commissioning mode while in at least the transport mode and the decommissioned mode, for example. That is, the processor is configured to specify a plurality of orientations, thresholds, and movements for the telemetric electronic device, for which when acceleration information is received, the processor is configured to interpret the accelerometer information, or in the alternative, initiate a message for transmission to a remote server for interpretation of the accelerometer information.

Other tap sequences may be used as suitable. Different orientations during transport and installation are specified to deactivate the electronic device 30 during transport. Accordingly, the accelerometer is configured to detect acceleration consistent with movement that reaches a threshold and the processor is configured to trigger sending acceleration information by the transmitter when the movement reaches the threshold, including for example, one of a usage event, a filling event, a natural event, a tapping event, a cylinder swap event, an activation event, a scheduled event, a movement event, and an orientation change. The processor 42 is configured to trigger sending of the GNSS information and/or the accelerometer information, for example in at least one of the transport, commissioning, operational and decommissioned modes, for example, wherein the device includes at least one sensor for sensing the state of a tank or meter and/or at least one sensor for sensing the usage of a tank or meter. The state of the tank or meter may be sensed, for example by a thermometer, a pressure gauge, and/or one or more accelerometers. The usage may be sensed by a float gauge, ultra-sound, magnetic and/or optical sensors.

Figure 9:
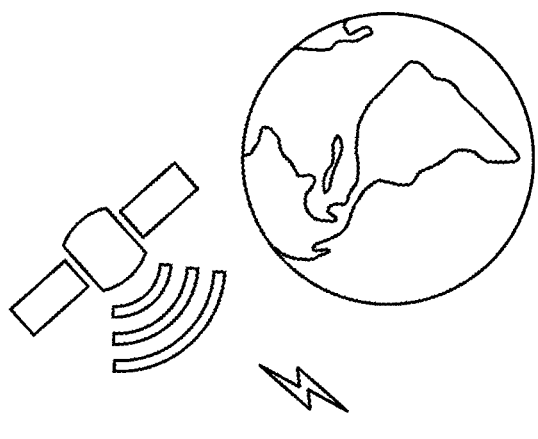
FIG. 9 shows a screen shot of a generated map on which is overlaid GNNS information generated by the electronic device of FIG. 3.
Figure 9:
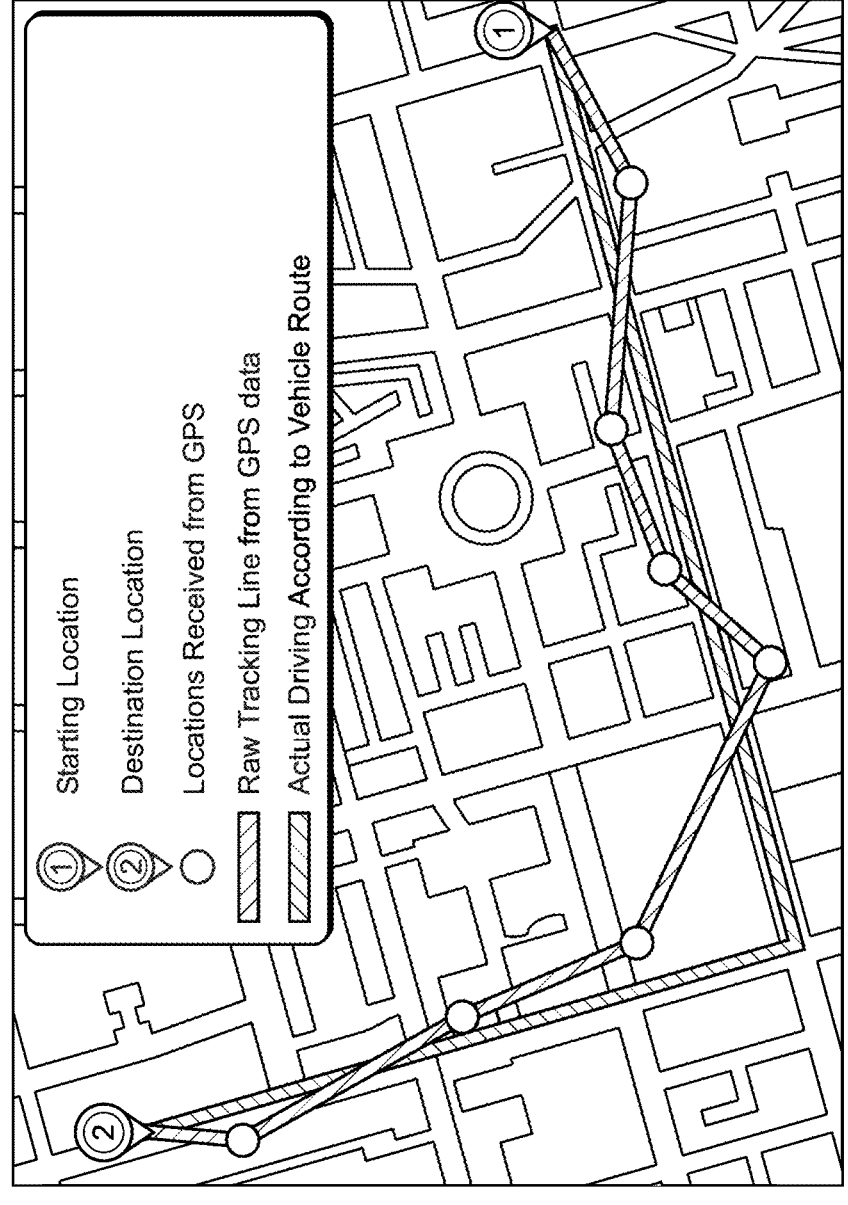

The processor 42 is configured to trigger sending the GNSS information when the processor 42 switches modes or at pre-determined times, such as after the correct orientation is determined at installation, as discussed above. The GNSS information is sent by the radio 46 to a remote computer system via the communications network. FIG. 9 shows a screen shot of map generated by the remote computer system on which is overlaid the GNSS information received thereby. The GNSS information is associated with the correct site and tank within a data store in the form of a database accessible by the remote computer system. The data store includes site and/or vessel information including a geographic indicator/reference of each site (most typically the site address or post code). In some cases, the data store will also have a global position reference for each vessel, for example, in the form of latitude and longitude values which are derived, for example, from a delivery truck computer system, which is generally as used to efficiently guide/route drivers to the correct tank to deliver gas.

The server then compares the GNSS information received from the electronic device 30 with a position reference derived by the server from the site address or post code, which may be done in any known way, including using a web service from Google. Association of site/tank to an electronic device 30 is automatic if the two positions are separated by no more than a predetermined distance (for example, 50 m for a site with only one tank, less for one with multiple tanks). If there are none or more than one candidate site or tank, then the server can present a list of candidate sites or tanks to the person to make a decision.

This association is relevant, for example, where the electronic device 30 is being retro-fitted to a tank that is already installed/operational as well as one that is yet to be installed on the consumer site. An added benefit in the latter case is that the device can be fitted at a depot before the vessel is delivered to a consumer's installation site and does not require an additional site visit by a device installer once the tank is installed at the installation site. In this case the tank installer just activates the device before leaving the site.

This association method also applies to electronic devices other than those for LPG bulk storage tanks, including automatic changeover-valves, gas cylinders, meter reading units etc.

The processor 42 is configured to trigger sending the accelerometer information, for example to the remote computer system via the communications network. The acceleration information may be integrated by the remote computer system to determine velocity and then position information, which may be overlaid on a map generated by the remote computer system.

Figure 10:
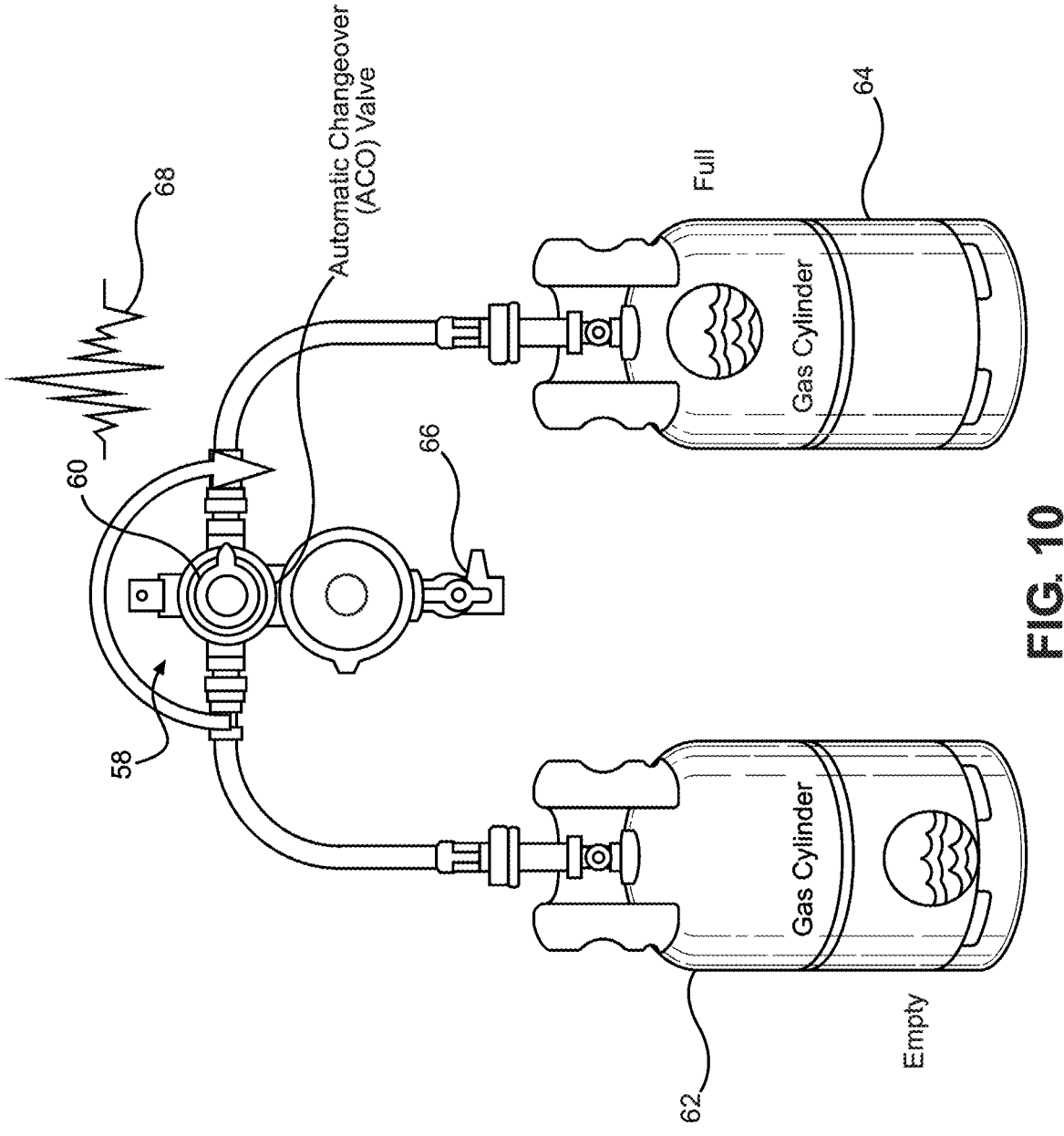
FIG. 10 shows another embodiment of an electronic device comprising an automatic changeover valve.

FIG. 10 shows another embodiment of an electronic device 58 comprising an automatic changeover valve 60. The electronic device 58 has identical or similar electronics 36 as the embodiment 30. The automatic changeover valve 60 is connected to two liquefied gas fuel cylinders 62, 64 for placing in fluid communication either one of the two liquefied gas fuel cylinders 62, 64 with a gas fuel outlet 66. The accelerometer within the electronic device 58 senses acceleration caused by rotational motion or vibration 68 that occurs when the automatic changeover valve 60 places the full liquefied gas fuel cylinder (which is cylinder 64 in FIG. 10) in fluid communication with the gas fuel outlet 66 when the other liquefied gas fuel cylinder (which is cylinder 62 in FIG. 10) is depleted. The accelerometer information generated by the accelerometer 40 is sent to the remote computer system via the communications network for logging this event. The remote computer system can promptly alert the service provide to come and change the empty liquefied gas fuel cylinder 62. The acceleration information may also be sent for detection of a cylinder swap event.

Embodments may not have all the functions of the embodiment described above. For example, alternative embodiments do not variously switch modes when tapped, do not detect tampering, and do not have a GNSS system.

An embodiment of a method of changing the mode of an electronic device having a plurality of modes will now be described, which can be implemented using the electronic device 30, for example. A step comprises generating accelerometer information when the electronic device is tapped. A step comprises switching from the first mode to a second mode of the plurality of modes in response to the accelerometer information satisfying an acceleration condition.

Various embodiments of the method may optionally comprise any of the following steps:

switching from the first mode to the second mode in response to the accelerometer information satisfying a first acceleration condition;

switching from the second mode to the first mode in response to the accelerometer information satisfying a second acceleration condition;

sending a tamper alert in response to the accelerometer information satisfying a tamper acceleration condition;

switching from one mode to another mode only in response to the accelerometer information satisfying an orientation condition;

sending GNSS information in response to switching from one mode to another mode; and sending the accelerometer information.

An embodiment of another method that can be implemented using the electronic device 30 will now be described. The embodiment comprises generating accelerometer information when an electronic device is tampered with and sending a tamper alert when the acceleration information satisfies a tamper acceleration condition.

An embodiment of yet another method that can be implemented using the electronic device 30 will now be described. The embodiment comprising generating GNSS information for an electronic device, and triggering the sending of the GNSS information.

The electronic devices 30, 54, 58 comprise non-transitory processor readable tangible media including program instructions which when executed by a processor causes the processor to perform a method disclosed above. The tangible media comprises memory in the form of non-volatile memory in the form of flash memory, but may comprise a hard drive or generally any suitable form on non-volatile memory.

The electronic device 30, 54, 58 comprise a computer program for instructing a processor, which when executed by the processor causes the processor to perform a method disclosed above.

SUMMARY OF EXAMPLE MODES

Production Mode

In production mode, any mode or functionality may be invoked, such as a low power mode and high power mode, sleep, wake, transmit and receive modes, depending on the requirements of a test. For example, to measure the power rail voltage level during high current use, a test system may invoke the device to transmit and then measure the power rail voltage. In other words, the test system sets up conditions for measurements for validating the hardware. Specific configurations and identification information may also be programmed into the electronic device memory (which may reside in the processor 42 external memory in the form of, for example, Flash), such as the unique device ID.

Transport Mode

In transport mode, all electronic components (ICs) in the device are in its lowest power mode, such as shutdown, sleep and low power mode, depending on the device's requirement, until an Activation event occurs. RF transmission is disabled in transport mode.

In transport mode, the accelerometer may be in its lowest output data rate (ODR) capable of detecting an Activation event. Upon detecting an Activation event, the accelerometer wakes up the micro-controller for transition into the Commissioning state.

There are no scheduled events, and can only transition to the next state via an Activation event.

Commissioning Mode

This is a temporary transitional state which may actually be implemented as a set of sequences or subroutines that occur, after an Activation event, within the Transport state.

The device sends GNSS fix data, its unique ID, tank levels, installation orientation, etc., and any other relevant information that is required for commissioning.

During this state, correct and incorrect installation orientation is detected by the accelerometer and the GNSS fix is used to associate the device to tank and site.

After running through these predefined sequence of actions, the device automatically transitions into the Operational state without further events.

Operational Mode

Operational mode is generally but not necessarily, on average, the device's highest power mode. The various components in the electronic device toggle between high and low power modes depending on the functions they need to perform, such as data transmitting, receiving GNSS, gas level data sampling, etc. To conserve power, the device is typically in low power mode for most of the time, only going into higher power modes for specific hardware components (ICs) that are necessary for the desired function, after which the components are put back into lower power modes.

In this mode, the electronic device performs data collection and transmission and waits for RTC events and Decommissioning events.

If the device is switched in this mode, the accelerometer detects the movement and wakes up the GNSS receiver to track its travel and update the server of its new locations.

In the case of a gas meter installation, a mechanical tamper attempt is detected by the accelerometer and an alarm is sent to the server.

Decommissioned Mode

In the decommissioned mode, the device is in low power mode in general, but may make regular, but infrequent, GNSS fix and transmit that data to alert the server of its location.

This mode may be entered into by Decommissioning event.

The device is generally transitioned out of this mode by an Activation event.

Now that embodiments have been disclosed, it will be appreciated that some embodiments may have some of the following advantages.

In the case of a large scale deployment (large quantity of devices, by numerous (unskilled) installers, in numerous geographies) a method of activation that does not require distribution of a custom activation tool and associated user training in the use thereof is of significant benefit.

Variations and/or modifications may be made to the embodiments described without departing from the spirit or ambit of the invention as claimed. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention as claimed, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments.

The invention claimed is:

1. A system, comprising:
an automatic changeover valve connected to a first cylinder and a second cylinder, wherein the automatic changeover valve is configured for switching fluid communication between either the first cylinder or the second cylinder and a fluid outlet;
a detection device configured to detect acceleration information of the automatic changeover valve; and
at least one processor configured to:
determine that the acceleration information indicates a rotational motion or vibration of the automatic changeover valve when the automatic changeover valve switches the fluid communication to the fluid outlet from the first cylinder to the second cylinder; and
generate a changeover event alert and/or generate a request to change or fill the first cylinder.

2. The system of claim 1, wherein the first cylinder and the second cylinder include first and second liquefied gas fuel cylinders configured to hold liquefied gas fuel.

3. The system of claim 2, further comprising:
at least one sensor for sensing a usage of the liquified gas fuel in the first cylinder and/or the second cylinder.

4. The system according to claim 1, wherein the detection device includes an accelerometer configured to detect the rotational motion or the vibration of the automatic changeover valve.

5. The system according to claim 1, further comprising:
a wireless communications unit configured to wirelessly transmit to a remote computing system.

6. The system of claim 5, wherein the at least one processor is installed in the system at or near the automatic changeover valve; and
wherein the wireless communications unit transmits the changeover event alert and/or the request to change or fill the first cylinder of the acceleration information to the remote computing system.

7. The system of claim 5, wherein the wireless communications unit transmits the acceleration information to the remote computing system.

8. The system of claim 7, wherein the remote computing system includes the at least one processor configured to determine that the acceleration information indicates the rotational motion or the vibration of the automatic changeover valve when the automatic changeover valve changes the outlet from the first cylinder to the second cylinder.

9. The system of claim 5, further comprising:
a global navigation satellite system (GNSS) receiver configured to obtain location information of the system; and
wherein the wireless communications unit transmits the location information to the remote computing system.

10. A method of monitoring an asset by a system installed on or coupled to the asset, wherein the asset includes an automatic changeover valve connected to a first cylinder and a second cylinder, wherein the automatic changeover valve is configured for switching fluid communication between either the first cylinder or the second cylinder and a fluid outlet, the method comprising:
detecting, by a detection device of the system, acceleration information of the asset;
determining, by at least one processor of the system, that the acceleration information indicates a rotational motion and/or vibration of the automatic changeover valve when switching the fluid communication to the fluid outlet from the first cylinder to the second cylinder; and transmitting, by a wireless transceiver of the system, an alert of a changeover event to a remote computing system.

11. The method of claim 10, wherein the first cylinder and the second cylinder are configured to hold a fluid, wherein the fluid includes a liquefied gas fuel.

12. The method of claim 10, further comprising:

configuring the at least one processor of the system with at least one predetermined acceleration condition, wherein the at least one predetermined acceleration condition includes a predefined acceleration profile of the rotational motion and/or the vibration of the automatic changeover valve when switching the fluid communication to the fluid outlet from the first cylinder to the second cylinder.

13. The method of claim 10, further comprising:

transmitting, by the wireless transceiver, a request to change or fill the first cylinder.

14. The method of claim 10, further comprising:

detecting, by at least one sensor, a usage of a fluid contained in the first cylinder and the second cylinder; and transmitting, by the wireless transceiver, the usage of the fluid in the first cylinder and the second cylinder to the remote computing device.

15. The method of claim 10, further comprising:

detecting, by a global navigation satellite system (GNSS) receiver, location information of the system; and transmitting, by the wireless transceiver, the location information of the system to the remote computing device.

16. The method of claim 10, wherein the detection device includes an accelerometer configured to detect the rotational motion or the vibration of the automatic changeover valve.

17. The method of claim 10, further comprising:

detecting, by the detection device of the system, additional acceleration information of the asset;

determining, by at least one processor of the system, that the additional acceleration information indicates a changing or filling of the first cylinder and/or the second cylinder; and transmitting, by the wireless transceiver of the system, a first alert of the changing or the filling of the first cylinder and/or the second cylinder.

18. A system, comprising:

a first liquefied gas fuel cylinder and a second liquefied gas fuel cylinder, wherein the first and second liquefied gas fuel cylinders are configured to hold a liquefied gas fuel;

an automatic changeover valve connected to the first and second liquified gas fuel cylinders, wherein the automatic changeover valve is configured for switching fluid communication between either the first liquified gas fuel cylinder or the second liquified gas fuel cylinder and a fluid outlet;

a detection device configured to detect acceleration information of the automatic changeover valve; and at least one processor configured to:

determine that the acceleration information indicates a rotational motion or vibration of the automatic changeover valve when the automatic changeover valve switches the fluid communication to the fluid outlet from the first cylinder to the second cylinder;

generate a changeover event alert and a request to change or fill the first liquefied gas fuel cylinder; and a wireless transceiver configured to transmit the changeover event alert and the request to a remote computing system.

19. The system according to claim 18, wherein the detection device includes an accelerometer configured to detect the rotational motion or the vibration of the automatic changeover valve.

20. The system of claim 19, further comprising:

a global navigation satellite system (GNSS) receiver configured to obtain location information of the system; and wherein the wireless transceiver transmits the location information to the remote computing system.

* * * * *